US010189435B2

(12) United States Patent
Templeton

(10) Patent No.: US 10,189,435 B2
(45) Date of Patent: Jan. 29, 2019

(54) VEHICULAR RESTRAINT DEVICE FOR ANIMALS

(71) Applicant: Gordon Daniel Oke Templeton, Winnipeg (CA)

(72) Inventor: Gordon Daniel Oke Templeton, Winnipeg (CA)

( * ) Notice: Subject to any disclaimer, the term of this patent is extended or adjusted under 35 U.S.C. 154(b) by 212 days.

(21) Appl. No.: 15/153,306

(22) Filed: May 12, 2016

(65) Prior Publication Data

US 2016/0332595 A1 Nov. 17, 2016

Related U.S. Application Data

(60) Provisional application No. 62/160,314, filed on May 12, 2015.

(51) Int. Cl.
| | |
|---|---|
| *A01K 27/00* | (2006.01) |
| *B60R 22/10* | (2006.01) |
| *A01K 29/00* | (2006.01) |
| *A01K 3/00* | (2006.01) |
| *A01K 1/02* | (2006.01) |

(52) U.S. Cl.
CPC ............ *B60R 22/10* (2013.01); *A01K 1/0272* (2013.01); *A01K 3/00* (2013.01); *A01K 27/002* (2013.01); *A01K 27/004* (2013.01); *A01K 29/00* (2013.01)

(58) Field of Classification Search
CPC .... A01K 27/00; A01K 27/001; A01K 27/002; A01K 27/003; A01K 27/004; A01K 1/0263; A01K 1/0272; B60R 22/10; B60R 22/105; B60R 22/14

USPC ....... 119/771, 776, 769, 772, 792, 793, 795, 119/794, 796, 797, 798, 856, 863, 857
See application file for complete search history.

(56) References Cited

U.S. PATENT DOCUMENTS

| | | | |
|---|---|---|---|
| 4,324,204 A * | 4/1982 | Friedman | A01K 1/04 119/771 |
| 5,529,018 A * | 6/1996 | Butts | A01K 1/0263 119/792 |
| 6,253,713 B1 | 7/2001 | Giedeman, III et al. | |
| 6,427,635 B1 * | 8/2002 | Ballard | A01K 1/0263 119/771 |
| 6,564,749 B1 * | 5/2003 | Dorsey | A01K 1/0263 119/771 |
| 6,792,894 B1 | 9/2004 | Donaldson | |
| 6,827,044 B2 | 12/2004 | Lobanoff et al. | |
| 7,343,881 B2 | 3/2008 | Schantz et al. | |

(Continued)

*Primary Examiner* — Trinh T Nguyen
(74) *Attorney, Agent, or Firm* — Ryan W. Dupuis; Ade & Company Inc.; Kyle R. Satterthwaite

(57) ABSTRACT

An animal restraint device restrains an animal relative to a vehicle seat having two lower anchors laterally spaced apart at a rear bottom of the seat and an auxiliary anchor separate from the lower anchors. The harness includes a chest panel and a plurality of straps for securement about the torso of the animal. Two lower tethers are securable between the harness and the two lower anchors of the vehicle. An upper retractable tether can be secured between a separate upper connector on the harness and the vehicle. In one embodiment, a retractable tether assembly is coupled between the harness and an anchor on the vehicle typically used for anchoring the upper tether of a vehicle child restraint seat. In another embodiment, an adapter allows the seatbelt of the vehicle to be used as the upper retractable tether.

17 Claims, 17 Drawing Sheets

(56) References Cited

U.S. PATENT DOCUMENTS

| | | | |
|---|---|---|---|
| 7,699,348 B2* | 4/2010 | Singh | B60R 22/10 |
| | | | 119/771 |
| 8,474,413 B2 | 7/2013 | Aaron | |
| 2003/0150400 A1* | 8/2003 | Lobanoff | A01K 1/0263 |
| | | | 119/771 |
| 2004/0025804 A1* | 2/2004 | Smith | A01K 1/0263 |
| | | | 119/792 |
| 2005/0179244 A1* | 8/2005 | Schroth | B60R 22/14 |
| | | | 280/808 |
| 2006/0288959 A1* | 12/2006 | Schantz | A01K 13/006 |
| | | | 119/792 |
| 2009/0066146 A1* | 3/2009 | Singh | B60R 22/10 |
| | | | 297/468 |
| 2012/0204812 A1* | 8/2012 | Singh | B60R 22/10 |
| | | | 119/771 |
| 2016/0316714 A1* | 11/2016 | Frick | A01K 1/0272 |

* cited by examiner

VEHICULAR RESTRAINT DEVICE FOR ANIMALS

This application claims the benefit under 35 U.S.C. 119(e) of U.S. provisional application Ser. No. 62/160,314, filed May 12, 2015.

FIELD OF THE INVENTION

The present invention relates to a restraint device for use in vehicle for restraining an animal therein, and more particularly the present invention relates to a vehicular restraint device for use in restraining a four-legged animal, for example a dog, using three anchoring points in the vehicle.

BACKGROUND

For the safety of animals being transported in vehicles, it is generally known to be desirable to restrain the animal relative to the vehicle to reduce likelihood of injury in the event of a vehicular collision.

U.S. Pat. No. 6,253,713 by Giedemann, U.S. Pat. No. 6,792,894 by Donaldson, U.S. Pat. No. 6,827,044 by Lobanoff, and U.S. Pat. No. 7,343,881 by Schantz et al generally relate to animal restraint devices for being secured about the animal in some manner. These devices generally do not permit anchoring to the vehicle by more than one anchoring location, such that in the event of a vehicular collision, the animal can be thrown in an unpredictable manner which may cause injury to the animal, other occupants of the vehicle, or both.

U.S. Pat. No. 8,474,413 by Aaron discloses a pet restraint harness for vehicles in which a harness is provided with two anchoring locations which are securable to various anchoring locations on the vehicle. Although the added anchoring locations compared to the previously noted devices provide some increased control over the restraint of the animal relative to the vehicle, the arrangement of the harness and the straps do not adequately distribute the force of impact across the torso of the animal. Furthermore, the fixed length connection of the harness to the vehicle limits the comfort of the animal, or is otherwise ineffective if the straps are configured with sufficient slack for comfort of the animal.

SUMMARY OF THE INVENTION

According to one aspect of the invention there is provided an animal restraint device for restraining an animal relative to a vehicle seat having two lower anchors laterally spaced apart at a rear bottom of the seat and an auxiliary anchor separate from the lower anchors, and a retractable tether assembly having a retraction mechanism operable to vary an overall length of the tether assembly between opposing first and second ends of the tether assembly in which the second end is secured to the auxiliary anchor of the vehicle, the device comprising:

a harness extending longitudinally between a front end and a rear end for being secured about a torso of the animal such that the front end is proximate a neck of the animal and the rear end is nearer to a rear of the animal than the front end;

two lower tethers, each extending between an inner end for connection to the harness and an outer end having a lower latch thereon for securement to a respective one of the lower anchors; and an upper connector on the harness for connection to the first end of the retractable tether assembly.

According to a first embodiment of the present invention, the retractable tether assembly may comprise an existing seatbelt of the vehicle. In this instance, the device preferably further comprises an adapter arranged to be secured on the upper connector which includes a universal female seatbelt connector for releasable connection to the seatbelt of the vehicle.

Alternatively, the retractable tether assembly may be an auxiliary adapter which is provided for securement to an auxiliary anchor of the vehicle typically used for anchoring the upper tether of a child restraint seat. In this instance, the assembly preferably further includes a first latch at the first end for releasable connection to the upper connector of the harness and a second latch at the second end for releasable connection to the auxiliary anchor of the vehicle.

By providing a harness which cooperates with a retractable upper tether connected to an auxiliary anchor of the vehicle independently of the two lower anchors, the tether is automatically adjusted in length according to the posture of the animal to maximize both comfort of the animal and safety for the animal by removing undesirable slack from the upper tether while providing a three-point anchoring of the animal relative to the vehicle.

Preferably the retraction mechanism is biased from an extended position to a retracted position which is reduced in length relative to the extended position.

The harness may further comprise a chest panel for extending along a chest of the animal and a back portion for extending along a back of the animal opposite the chest panel, in which the two lower tethers are securable to the back portion at a common mounting location which is longitudinally spaced from a mounting location of the first latch of the retractable tether assembly.

The harness may further include two lateral straps for extending between the chest panel and the back portion of the harness at laterally opposing sides of the animal, in which the common mounting location of the two lower tethers is proximate a connection of the lateral straps to the back portion.

The harness may yet further comprise i) two front straps joined to one another at an intermediate location on the chest panel to extend laterally outward in opposing directions panel from respective inner ends to respective outer ends of the front straps for connection to the back portion through the lateral straps respectively; and ii) two rear straps joined to one another on the chest panel proximate the rear end to extend laterally outwardly in opposing directions from respective inner ends to respective outer ends of the rear straps in converging relationship with the two front straps respectively such that each front strap is joined with the respective rear strap at the outer ends thereof.

The harness may also include a pair of mounting locations at laterally opposing sides of the harness, such that in an alternative arrangement, the two lower tethers can be connected to the mounting locations instead of a central common location. When the harness further comprises i) two lateral straps for connection to the back portion of the harness at laterally opposing sides of the animal; ii) two front straps joined to one another at an intermediate location on the chest panel to extend laterally outward in opposing directions panel from respective inner ends to respective outer ends of the front straps for connection to the back portion through the lateral straps respectively; and iii) two rear straps joined to one another on the chest panel proximate the rear end to extend laterally outwardly in opposing directions from respective inner ends to respective outer ends of the rear straps in converging relationship with the two front straps respectively such that each front strap is joined with the respective rear strap at the outer ends thereof, the pair of mounting locations of the two lower tethers may be located at the outer ends of the front and rear straps respectively.

When the harness includes a chest panel for extending along a chest of the animal and a back portion for extending along a back of the animal opposite the chest panel, preferably the back portion is adjustable in length between a connection to the retractable tether and a connection to the lower tethers.

When the harness includes a chest panel for extending along a chest of the animal, a back portion for extending along a back of the animal opposite the chest panel, and two lateral straps for extending between the chest panel and the back portion of the harness at laterally opposing sides of the animal, the lateral straps may be adjustable in length.

When the harness includes a chest panel for extending along a chest of the animal and a back portion for extending along a back of the animal opposite the chest panel, the harness may further include two shoulder straps joined to the chest panel proximate the front end at inner ends of the shoulder straps and extending to respective outer ends for connection to the back portion in which the shoulder straps are arranged to extend over respective shoulders of the animal between the chest panel and the back portion.

According to a second aspect of the present invention there is provided an animal restraint device for restraining an animal relative to a vehicle seat having two lower anchors laterally spaced apart at a rear bottom of the seat and an auxiliary anchor separate from the lower anchors, the device comprising:

a harness extending longitudinally between a front end and a rear end for being secured about a torso of the animal such that the front end is proximate a neck of the animal and the rear end is nearer to a rear of the animal than the front end, the harness comprising:

a chest panel extending in the longitudinal direction for spanning at least a portion of a chest of the animal;
  two front straps joined to one another at an intermediate location on the chest panel to extend laterally outward in opposing directions panel from respective inner ends to respective outer ends of the front straps;
  two rear straps joined to one another on the chest panel proximate the rear end to extend laterally outwardly in opposing directions from respective inner ends to respective outer ends of the rear straps in converging relationship with the two front straps respectively such that each front strap is joined with the respective rear strap at the outer ends thereof; and
  a back portion for connection between the outer ends of the front and rear straps at a back of the animal;
at least one lower tether extending between an inner end for connection to the back portion of the harness and an outer end having a lower latch thereon for securement to at least one of the lower anchors.

By providing a harness with converging front and rear straps at both sides of a chest panel, the force of an impact can be more evenly distributed across the torso of the animal to reduce concentration of the impact to any one location on the animal and thus reduce injury to the animal.

When the harness includes a center strap extending in the longitudinal direction along the chest panel of the harness, preferably the inner ends of the front and rear straps are connected to the center strap.

The harness according to the second aspect of the invention may also include two shoulder straps joined to the chest panel proximate the front end at inner ends of the shoulder straps and extending to respective outer ends for connection to the back portion in which the shoulder straps are arranged to extend over respective shoulders of the animal between the chest panel and the back portion. The shoulder straps may be adjustable in length between the inner and outer ends thereof.

There may also be provided an upper tether including a first latch for connection to the back portion of the harness and a second latch for connection to the auxiliary anchor of the vehicle.

The back portion of the harness may be adjustable in length between a connection of the upper tether and a connection of the at least one lower tether.

Each front strap and the respective rear strap may be connected to the back portion by a respective lateral strap which is adjustable in length.

An auxiliary leash anchor may be provided on the chest panel proximate the front end of the harness.

Various embodiments of the invention will now be described in conjunction with the accompanying drawings in which:

BRIEF DESCRIPTION OF THE DRAWINGS

In the drawings like characters of reference indicate corresponding parts in the different figures.

DETAILED DESCRIPTION

Figure 1:
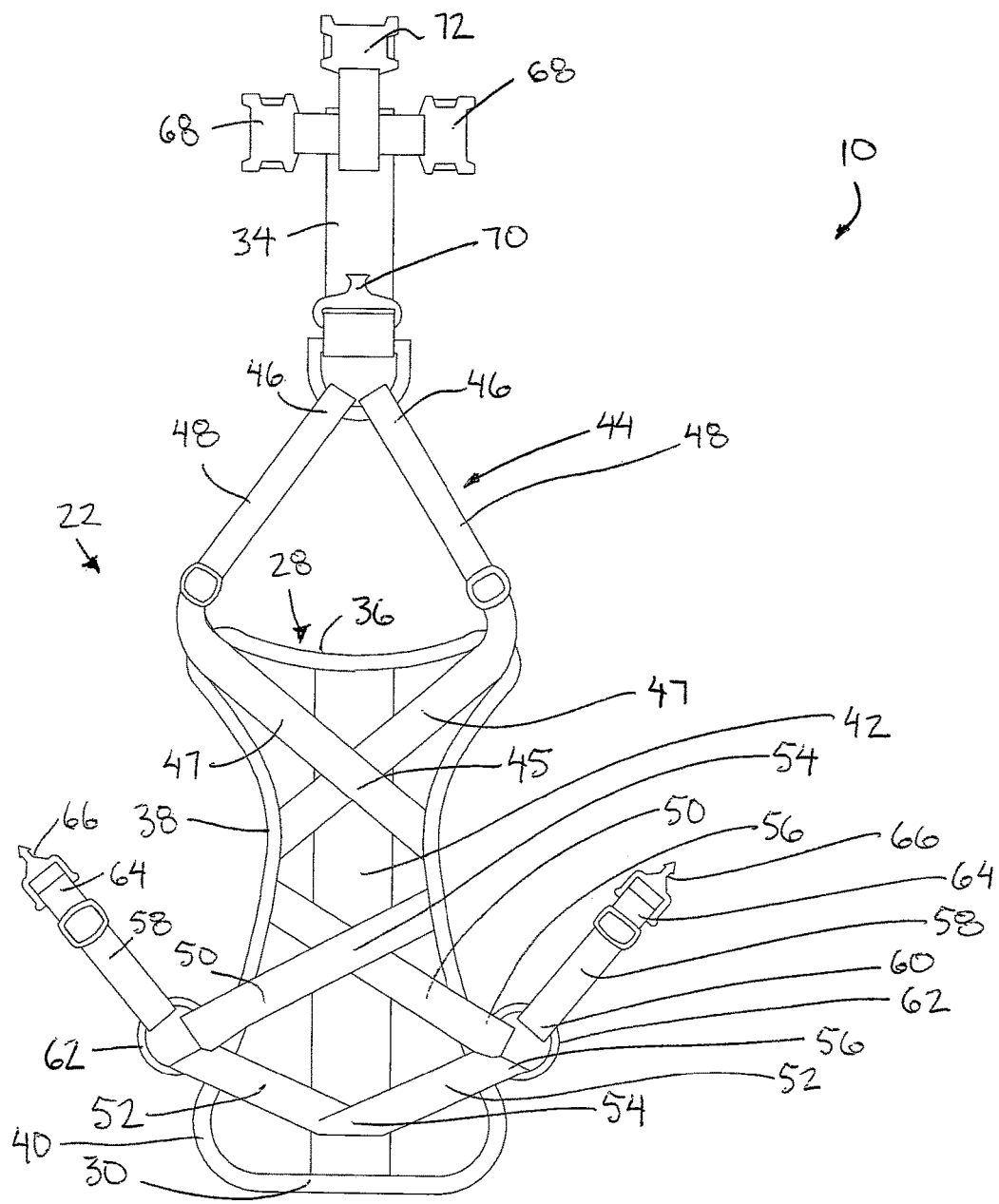
FIG. 1 is bottom plan view of the harness of the restraint device.
Figure 2:
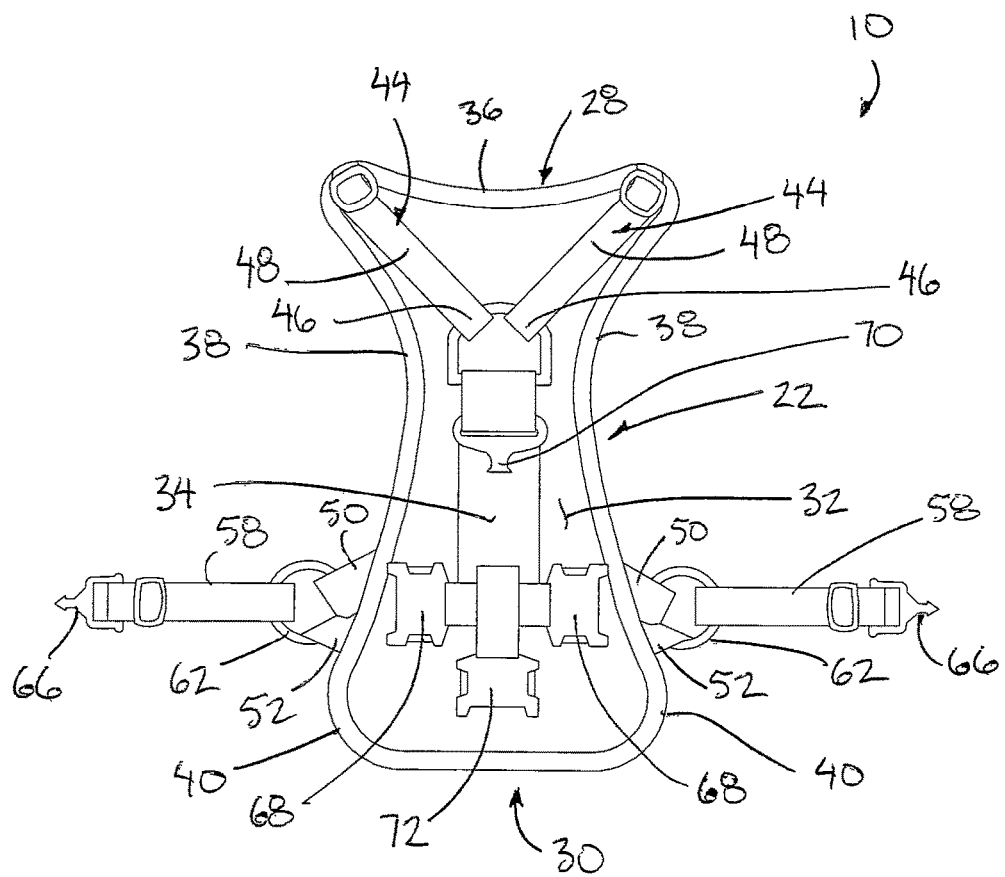
FIG. 2 is a top plan view of the harness.
Figure 3:
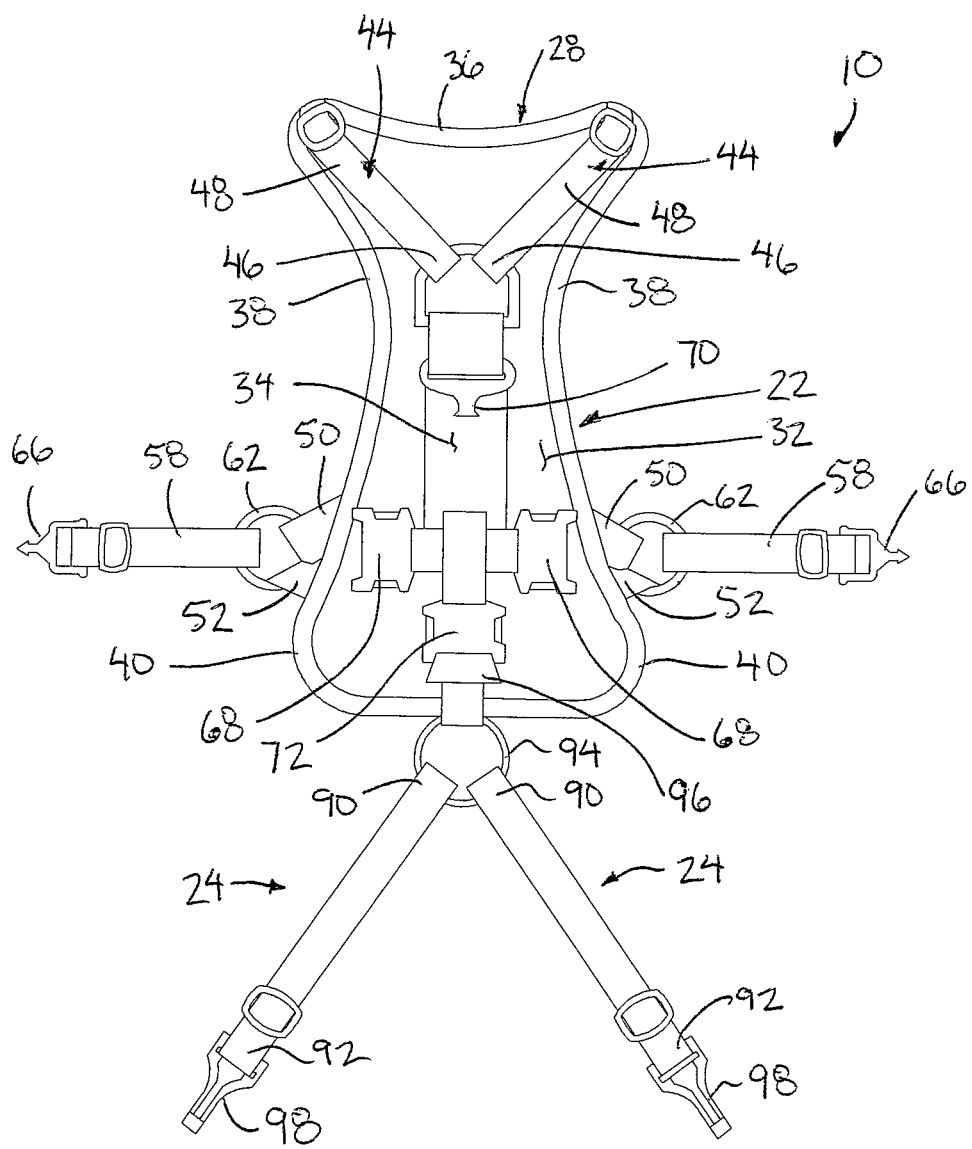
FIG. 3 is a top plan view of the harness including the two lower tethers connected thereto according to a first embodiment of the lower tethers, shown with the lateral straps in a released position.
Figure 4:
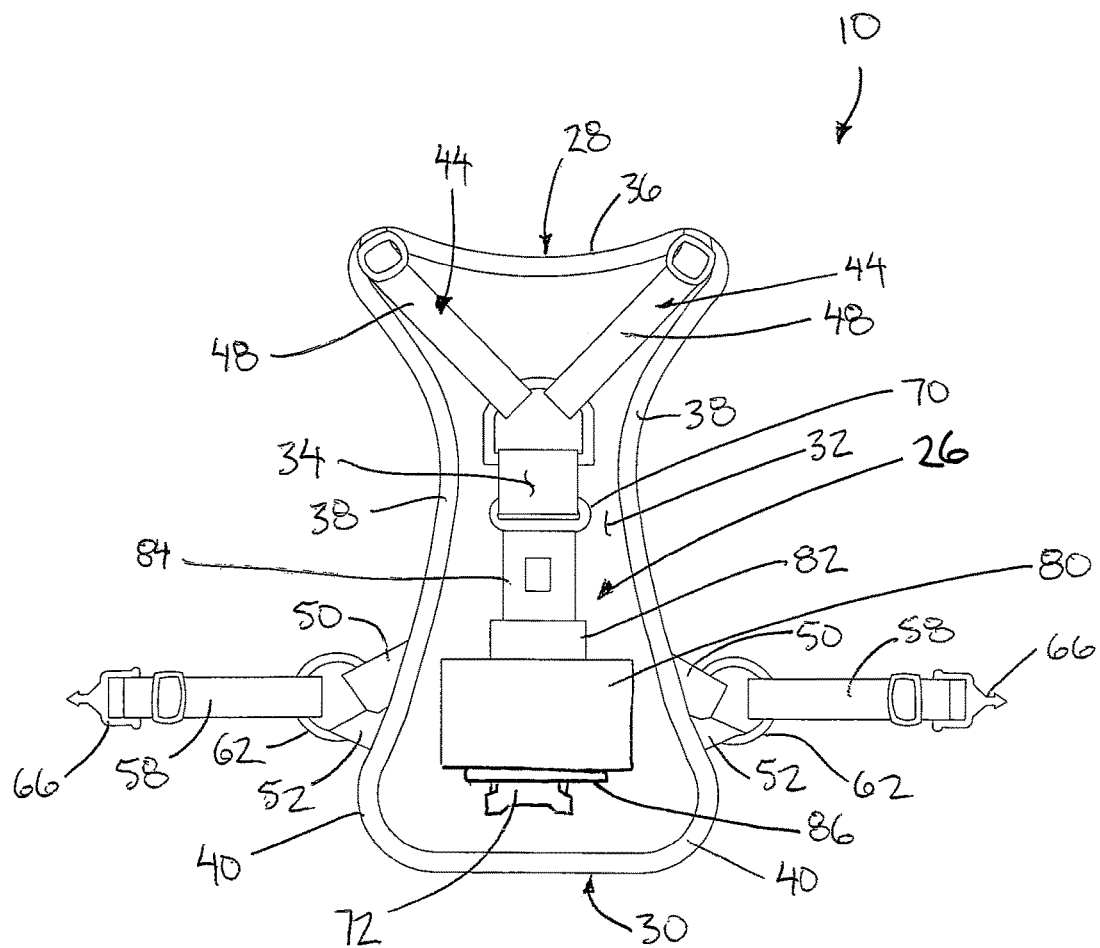
FIG. 4 is a top plan view of the harness including the retractable tether connected thereto.
Figure 5:
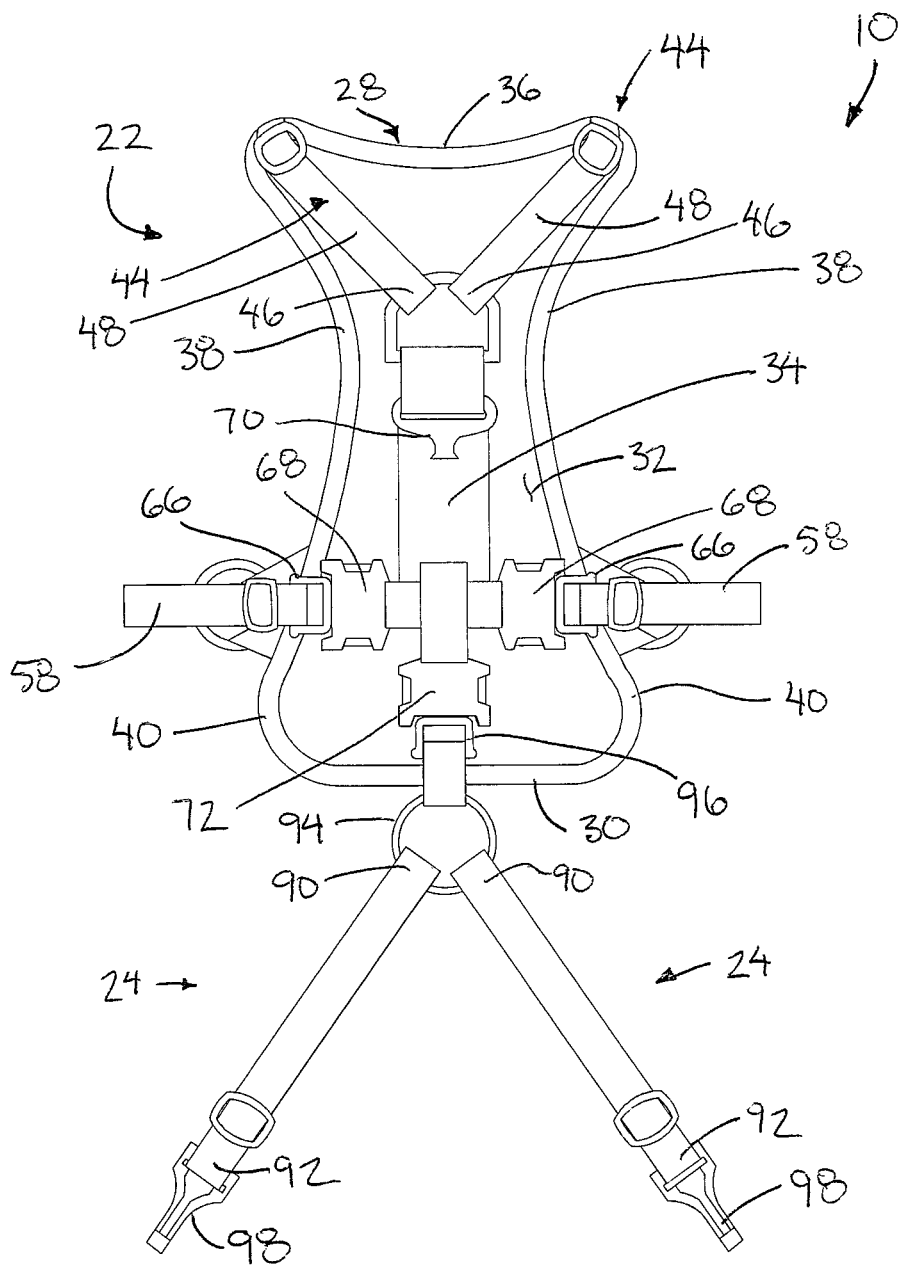
FIG. 5 is a top plan view similar to FIG. 3, shown with the lateral straps in a secured position.
Figure 6:
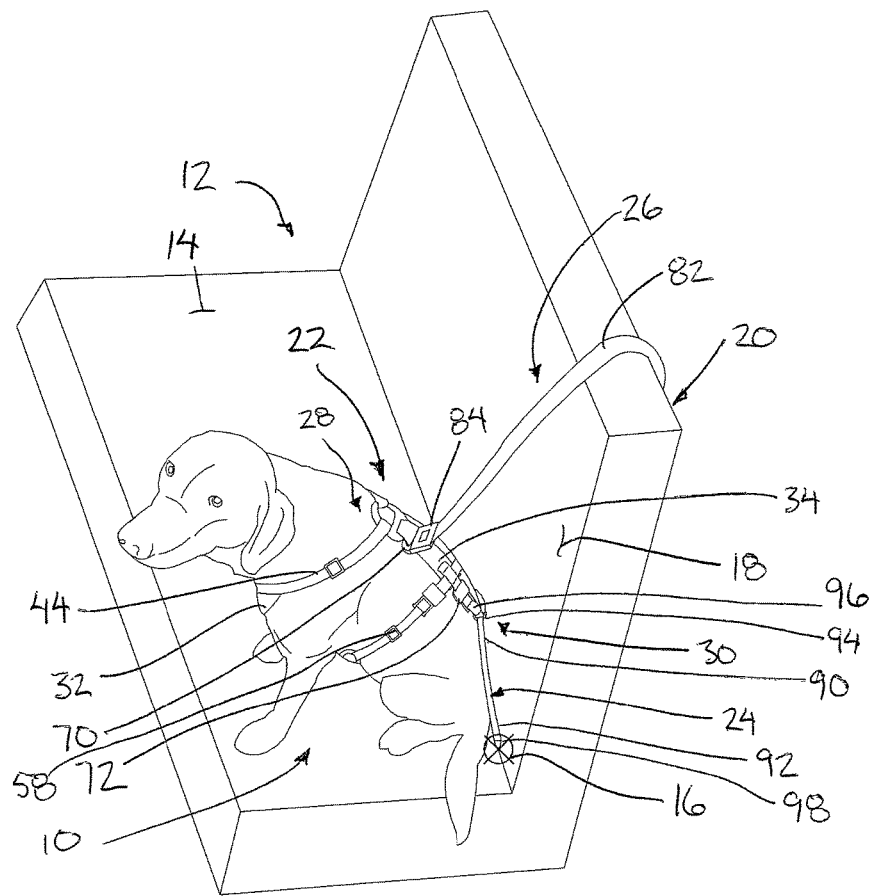
FIG. 6 is a perspective view of the restraint device shown securing an animal to the auxiliary anchor and both lower anchors of a vehicle seat.
Figure 7:
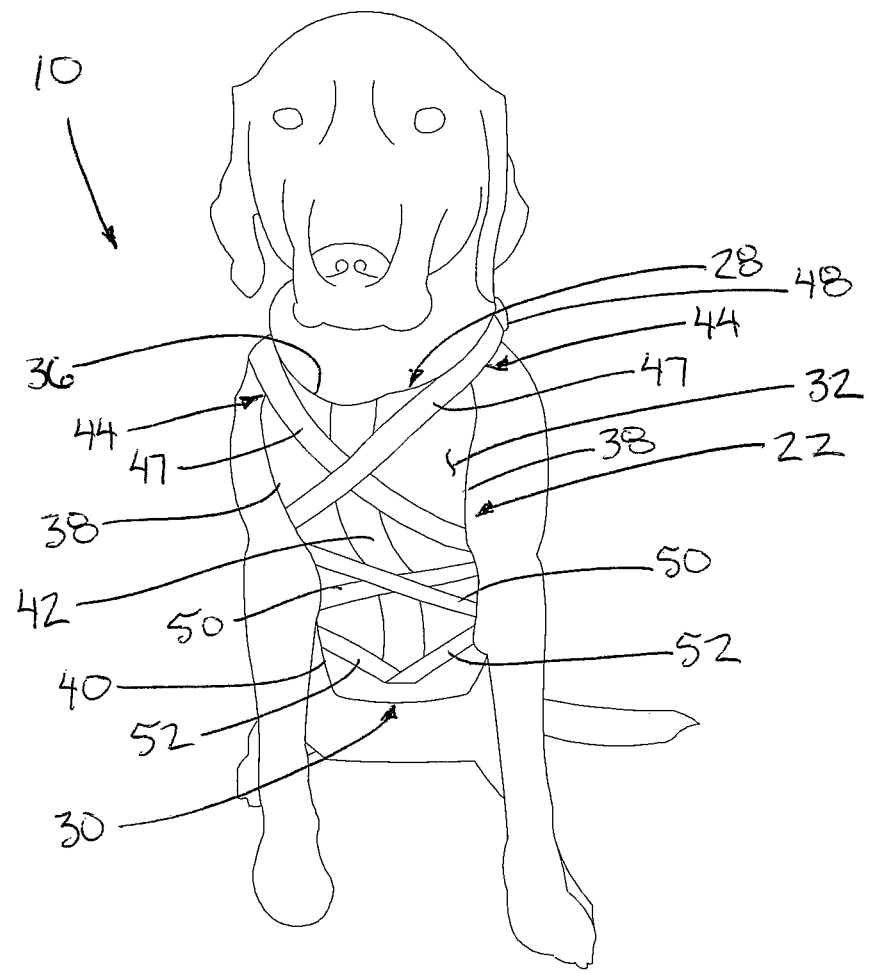
FIG. 7 is a front view of the harness supported on an animal, showing a bottom side of the harness.
Figure 8:
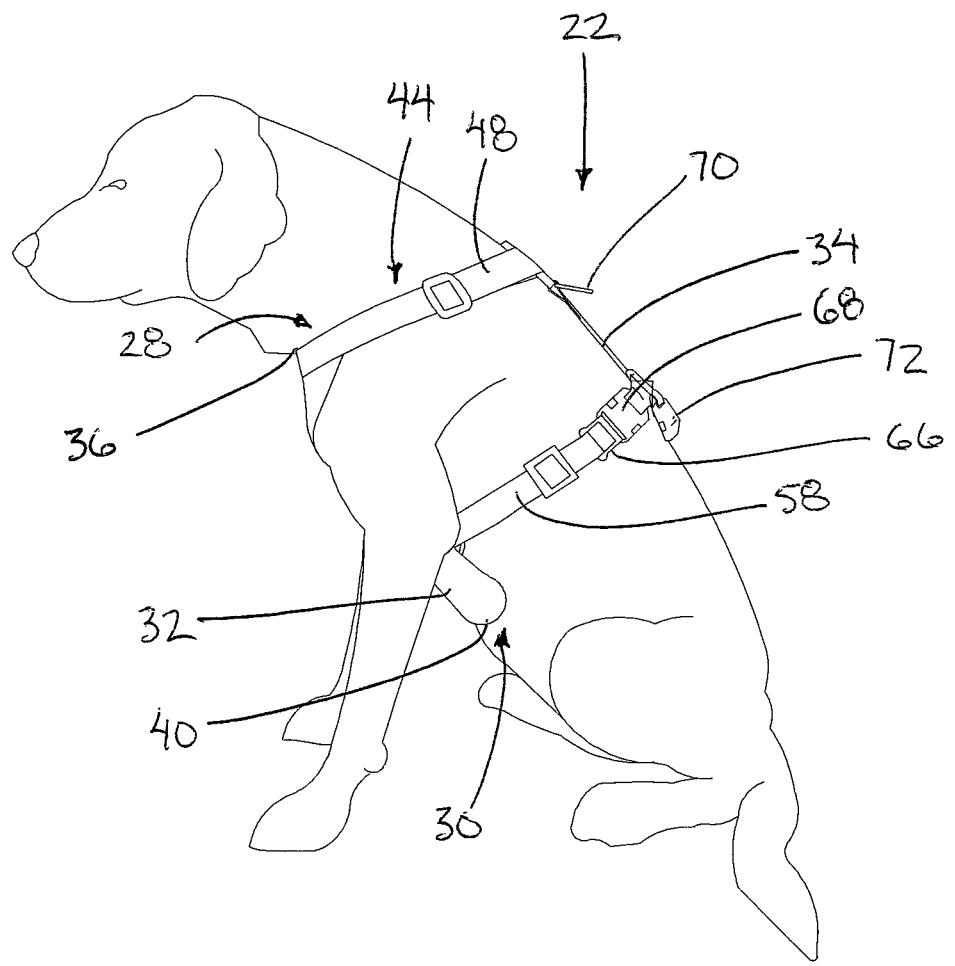
FIG. 8 is a side view of the harness supported on an animal.
Figure 9:
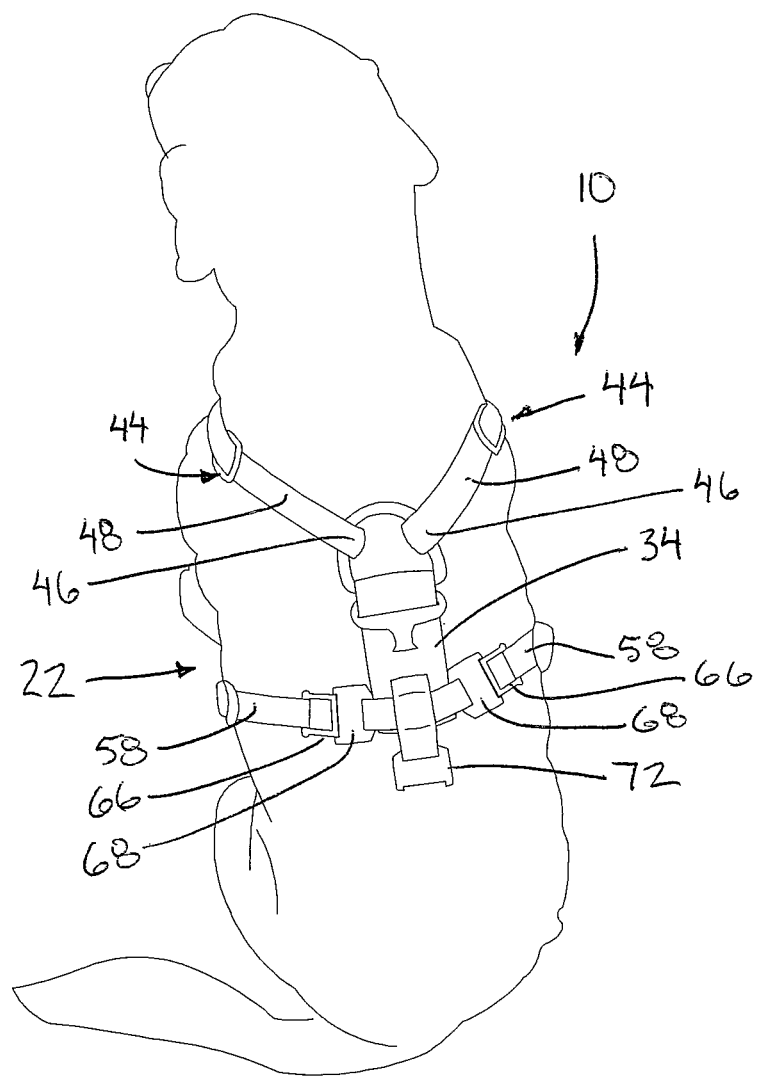
FIG. 9 is a rear view of a portion of the harness supported on an animal, showing a top side of the harness.
Figure 10:
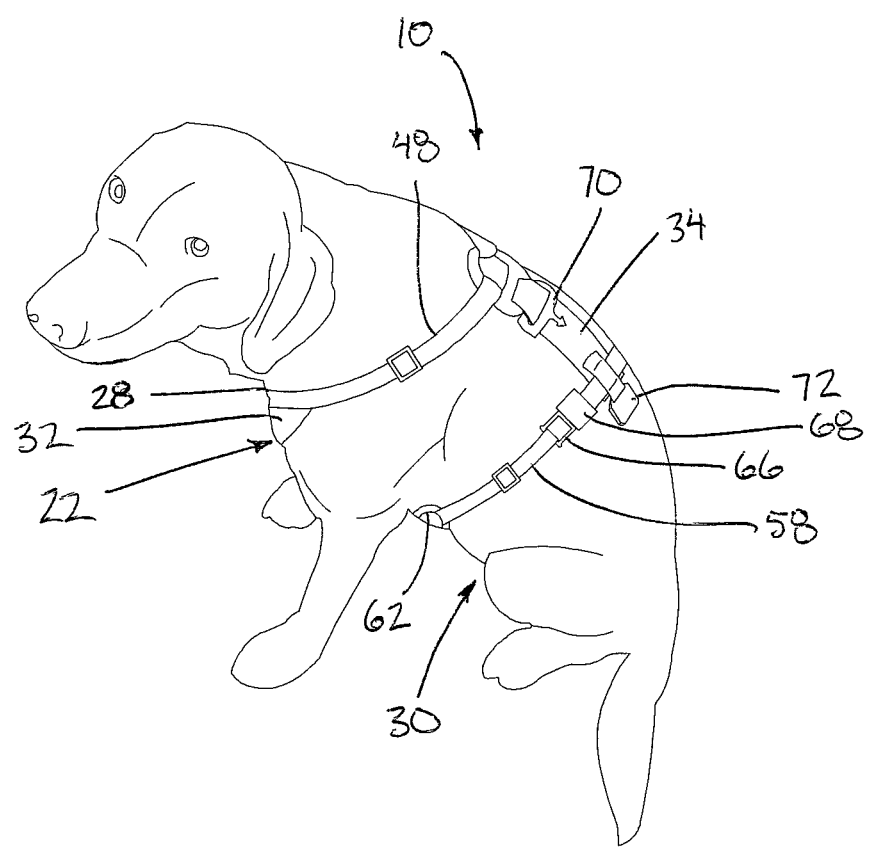
FIG. 10 is a perspective top view of the harness supported on an animal.
Figure 11:
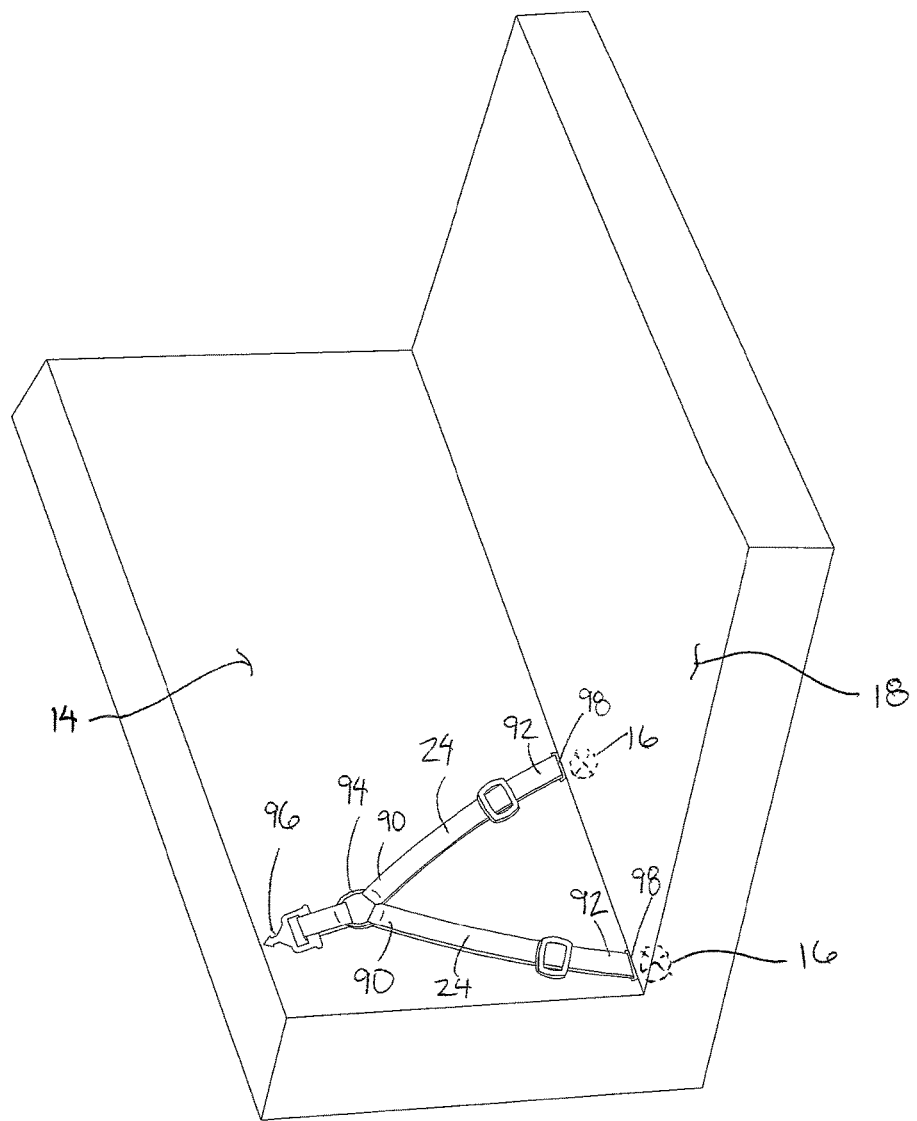
FIG. 11 is a perspective view of the two lower tethers secured to the two lower anchors of the vehicle.
Figure 12:
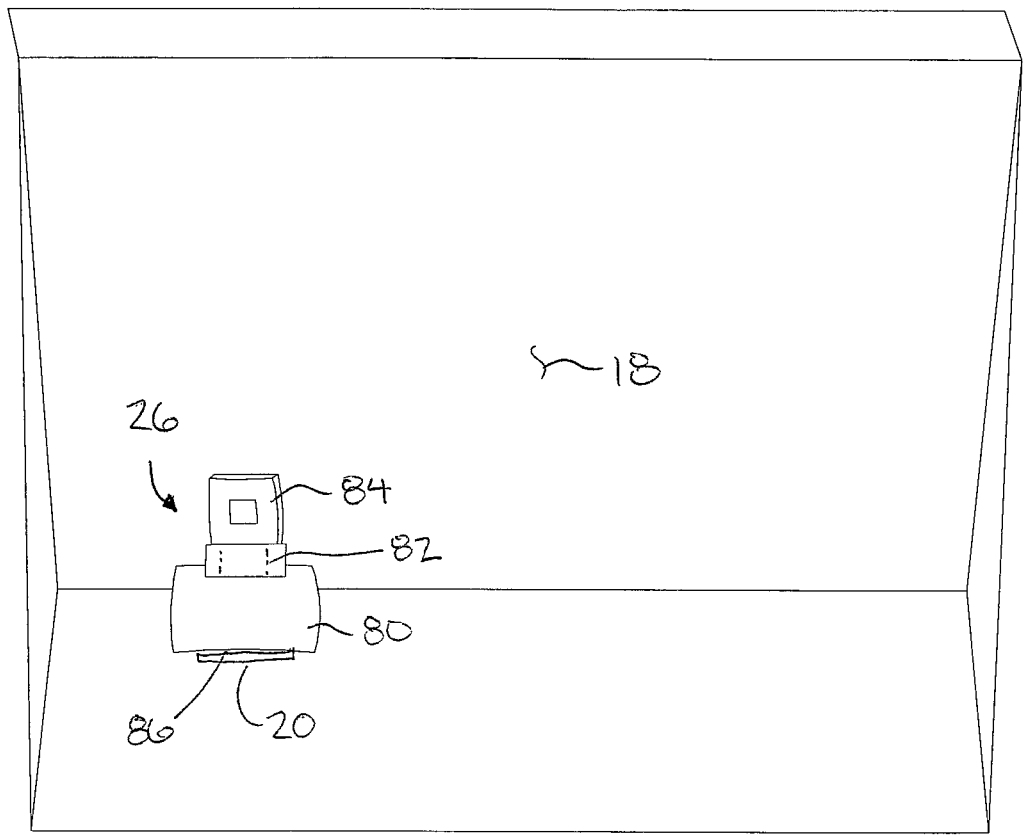
FIG. 12 is a perspective view of the retractable tether secured to the auxiliary anchor of the vehicle found at a rear of a seat back of the vehicle seat.
Figure 13:
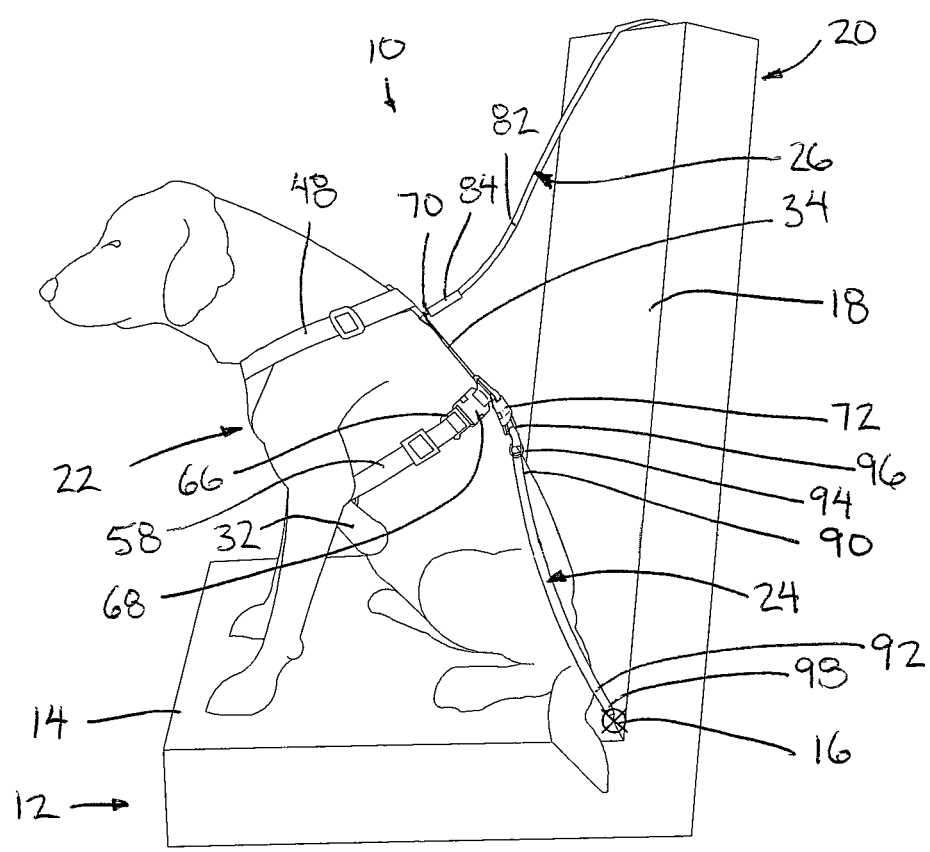
FIG. 13 is a side elevational view of the restraint device shown restraining a dog relative to a vehicle seat according to the first embodiment of the upper tether.
Figure 14:
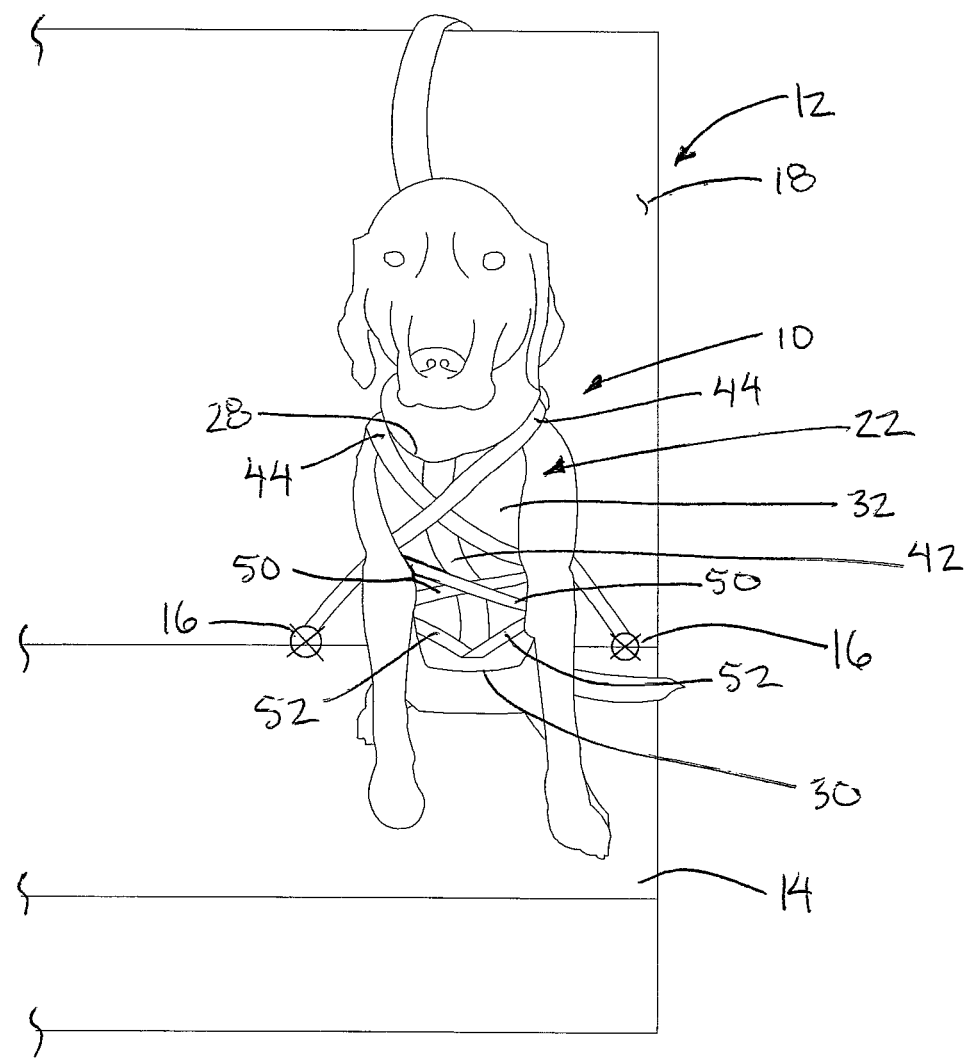
FIG. 14 is a front elevational view of the device according to FIG. 13.
Figure 15:
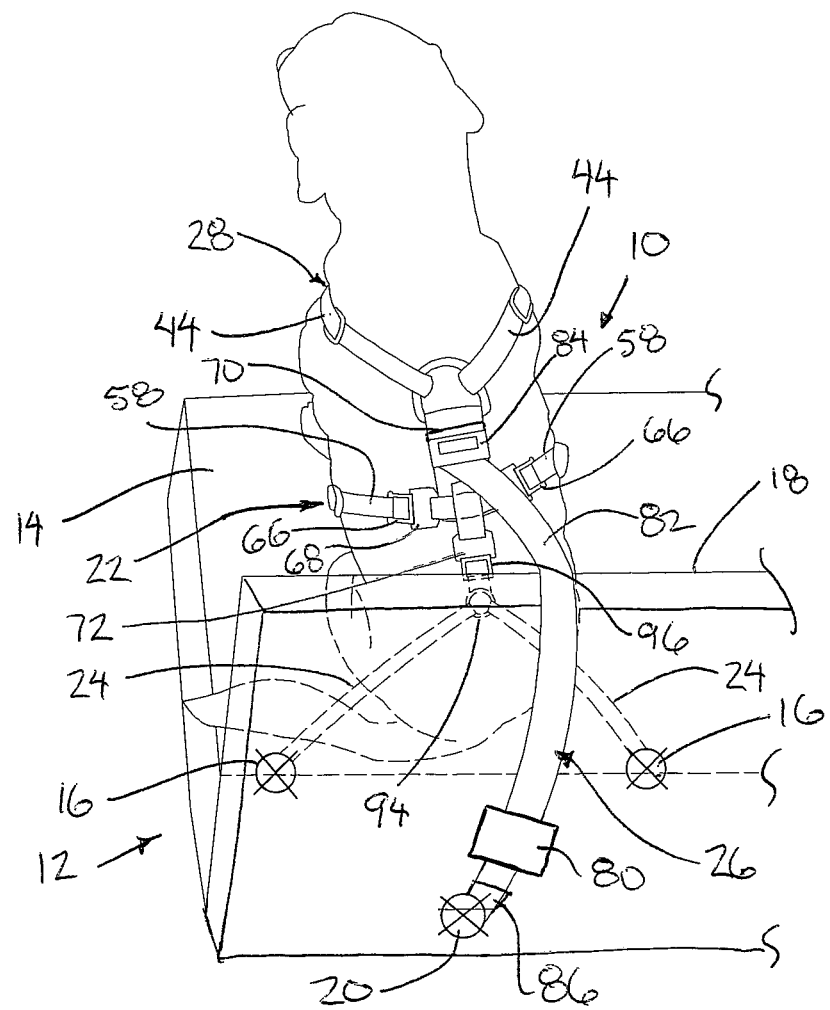
FIG. 15 is a rear perspective view of the device according to FIG. 13.

Referring to the accompanying figures there is illustrated a vehicular animal restraint device generally indicated by reference numeral 10. The device 10 is particularly suited for use with a 4 legged animal, for example a dog, for securing the animal relative to a seat 12 of a vehicle.

In a typical vehicle, the seat 12 is provided with a seat bottom 14 which includes two lower anchors 16 situated at laterally spaced apart positions in proximity to a rear end of the seat bottom 14. The lower anchors 16 comprise universal type anchors which are commonly used for securement of child seats and the like within a vehicle. The vehicle seat 12 further includes an upright seat back 18 extending upwardly from a rear end of the seat bottom which includes one auxiliary anchor 20 associated therewith. The auxiliary anchor 20, also generally referred to herein as an upper anchor 20, is typically laterally centered relative to the two lower anchors 16 at a location which is rearward of the seat back 18. The auxiliary anchor 20 is in proximity to the top end of the seat back when the vehicle includes an upper deck surface near the headrest elevation behind the rear seats. In some other instances, the auxiliary anchor is provided at a lower elevation on the rear side of the seatback 18, on the floor of the vehicle at a location rearward of the seat, or on the roof of the vehicle for example. The auxiliary anchor also comprises a universal anchor of the type which is common for securing the upper tether of a child seat and the like.

The device 10 generally includes i) a harness 22 for securement about the torso of an animal, ii) two lower tethers 24 for connection between the harness 22 and the two lower anchors 16 of the vehicle respectively, and iii) one upper connector 70 on the harness for connecting the harness to an upper retractable tether 26 which can be anchored relative to the auxiliary anchor 20 of the vehicle.

The harness 22 extends generally in a longitudinal direction from a front end 28 intended to be positioned in proximity to the neck of the animal to a rear end 30 arranged to be located proximate the rear end of the animal. More particularly, the harness includes a chest panel 32 for spanning at least a portion of the chest of the animal between the front and rear ends, and a back portion 34 for spanning at least a portion of the back of the animal between the front and rear ends, opposite the chest panel 32. Various straps are provides for interconnection between the chest panel 32 and the back portion 34 for securing the harness about the torso of the animal as described in further detail below.

The chest panel 32 comprises a non-elastic, flexible panel of material spanning most of the chest of the animal. More particularly, the chest panel spans from a front edge 36 at the front end of the harness which is generally concave in profile for conforming about the front side of the neck of the animal. The chest panel 32 also includes two generally longitudinally extending side edges each having i) a front portion 38 proximate the front end, which is concave in profile to define a recess generally receiving one of the front legs of the animal therein, and ii) a rear portion 40 spanning between the front portion and the rear end of the chest panel. The chest panel 32 is wider between the two rear portions 40 of the side edges than between the front portions 38 such that the rear portions are generally convex and protrude laterally outwardly near a belly portion of the animal longitudinally between the front and rear legs of the animal.

The chest panel 32 is formed as a multi-layer construction comprising an inner layer of material, an outer layer of material and a layer of resilient padding material between the non-elastic and flexible inner and outer layers respectively.

The harness 22 further includes a central strap 42 spanning the full length between the front and rear ends of the harness along the outer side of the chest panel at a laterally centered location between the side edges. The central strap has a greater tensile strength than the material of the chest panel and is sewn or in otherwise bonded connection directly against the outer side of the chest panel.

Two shoulder straps 44 of the harness each extend from an inner end joined to the central strap 42 by suitable stitching to a respective outer end 46. The inner ends 45 of the two shoulder straps cross over one another at the central strap 42 in proximity to the front end of the chest panel so as to be joined to one another, the chest panel, and the central strap by stitching. Each of the shoulder straps includes an inner portion 47 extending laterally across the outer side of the chest panel from the inner end 45 towards the outer end, and an outer portion 48 extending laterally outwardly beyond the side edge of the chest panel for extending over the shoulders of the animal. The outer portions which extend from the inner portions 47 to respective outer ends 46 are arranged to be joined to one another at a forward end of the back portion 34. At least the outer portions 48 of the two shoulder straps may be adjustable in length using suitable strap adjuster.

The outer ends 46 of the shoulder straps 44 and the front end of the back portion 34 each form a loop of material which receives a respective portion of a D-ring therein for joining the outer ends 46 to the front end of the back portion 34. The D-ring is a generally annular metal ring which allows for easier length adjustment of the shoulder straps and the back portion 34 and also allows for some relative angular adjustment between the connection of the shoulder straps to the back portion 34 to better accommodate different sizes of animals.

The back portion 34 generally comprises an elongate strap member extending generally in the longitudinal direction of the harness between the front and rear ends. The strap has a high tensile strength and is both inelastic and flexible similarly to the central strap 42 of the chest panel.

At each of the two laterally opposed side edges of the chest panel, the harness is provided with one front strap 50 and one rear strap 52. Each of the front and rear straps extends generally laterally outwardly from an inner end 54 which is joined by stitching to the central strap to an outer end 56 which is laterally outward in relation to the corresponding side edges of the chest panel. The two front straps 50 cross over one another at their inner ends 54 at a longitudinally central location proximate the transition between the front portion and the rear portion of the two side edges of the chest panel, and are joined to one another and the chest panel by stitching. The front straps extend generally laterally outwardly at a rearward angular inclination towards the rear end. When supported on an animal, the front straps are supported at the inner ends at a location which is approximately central between the front legs of the animal.

The rear straps 52 are similarly joined to one another at their inner ends 54 at the central strap and are joined to the central strap at the rear end of the chest panel. In the illustrated embodiment, both rear straps are formed of a single, integral strap member folded over at a central location to define the inner ends of the two rear straps. The rear straps 52 extend laterally outwardly from the inner ends towards the respective outer ends 56 at a forward inclination such that the rear strap and corresponding front strap at each of the two laterally opposed sides of the chest panel are in a converging relationship with one another so that the outer end of each rear strap 52 is joined to the outer end of the corresponding front strap at the same side of the harness.

The two front straps are thus arranged in a generally V-shaped relationship with one another with a forward projecting apex whereas the two rear straps are joined to one another in a V-shape with a rearward projecting apex. The connection of the front and rear straps at the outer ends thereof result in the two front straps and the two rear straps forming a generally diamond shaped pattern intended to be generally aligned at a central location between the front and rear legs of the animal in use.

The harness further comprises two lateral straps 58 which are joined at respective inner ends 60 to the outer ends of the front and rear straps. More particularly, each front strap is joined to the respective rear strap at a common mounting ring 62 such that each lateral strap 58 is mounted at the respective inner end on a respective one of the mounting rings 62. The lateral straps continue to extend outwardly in relation to the chest panel for extending from the front and rear straps connected to the chest panel along a respective side of the animal towards a respective outer end 64 which is coupled to the back portion 34 at the back of the animal.

Each of the lateral straps 58 is adjustable in length similarly to the outer portion of each shoulder strap using a suitable strap adjuster for example. The two lateral straps 58 include a releasable connector 66 at the outer end thereof which selectively mates with a corresponding connector 68 on the back portion. The length of the lateral straps is typically adjusted such that when the connectors 66 at the outer ends of the lateral straps are selectively latched in connection with the corresponding connectors on the back portion, the animal is snuggly received between the rear end of the chest panel and the rear end of the back portion 34. The lateral straps 58 connect to the back portion 34 at a location which is spaced rearwardly proximate the rear end of the back portion in relation to the connection of the shoulder straps at the front end of the back portion.

The back portion further includes a releasable upper connector 70 supported at a fixed location adjacent the front end of the back portion for selective connection to the upper retractable tether 26 as described in further detail below.

The back portion also includes a releasable lower connector 72 at the rear end of the back portion for selective connection to the two lower tethers 24 as described in further detail below.

The back portion 34 in the illustrated embodiment is a fixed length between the upper connector and the lower connector, however, in further embodiments the back portion may alternatively incorporate an intermediate strap adjuster therein which permits the overall length of the back portion between the upper connector and lower connector to be adjusted, and which adjusts the overall length of the back portion between the connection of the shoulder straps at the front end and the connection of the lateral straps proximate the rear end thereof.

According to the first embodiment, the upper retractable tether 26 is an adapted provided with the device 10 for connection between the harness and the auxiliary anchor 20 of the vehicle that is normally used for securing the upper tether of a child restraint seat. The upper retractable tether 26 in this instance generally includes a retraction mechanism including an outer housing 80 with an internal drum which is biased to wind-up a retractable tether portion 82 thereon. An inner end of the retractable tether portion 82 is thus connected to the drum to permit the tether portion to be wound onto the internal drum. A first latch 84 is supported on the outer end of the retractable tether portion and is suitably configured for releasable connection to the upper connector 70 at the back portion of the harness. The winding mechanism further includes a second latch 86 which is fixed to the housing of the winding mechanism and which is suitably arranged to form a releasable connection to the auxiliary anchor 20 of the vehicle. In this arrangement, the second latch 86 secures the housing in generally fixed relation to the upper vehicle anchor 20 such that the retractable tether portion 82 can be extended from the housing of the winding mechanism to extend overtop of the seatback for connection of the first latch to the upper connector of the harness.

As the tether portion is extended and retracted from the winding mechanism, the overall length of the retractable tether between the first latch and the second latch is readily adjusted from a maximum length when the tether is extended from the housing, to a shorter retracted length when some or all of the tether portion is retracted into the housing of the winding mechanism. The winding mechanism includes a suitable biasing spring acting between the drum and the housing which biases the mechanism towards a retracted position of the tether portion.

The winding mechanism is further provided with a stop which prevents the tether portion from being dispensed from the housing of the winding mechanism beyond a prescribed maximum extension length. The stop of the winding mechanism is adjustable such that the prescribed or dictated maximum length of the retractable tether portion can be adjusted. The winding mechanism further includes a stop mechanism which functions similarly to a conventional vehicular seatbelt to prevent a sudden extension of the tether from the housing indicative of a vehicular accident, regardless of the extension length of the tether from the housing. The adjustability of the spring winding force and the position of the stop accommodates for mounting of the retraction mechanism in different vehicle types which may mount the auxiliary anchor 20 at the rear of the vehicle seat, near the elevation of the head rest, near the elevation of the floor of the vehicle, or at varying locations therebetween.

According to the first embodiment of the lower tethers 24, shown in FIGS. 1 to 15, the lower tethers 24 are arranged such that each extends from an inner end 90 to an outer end 92. The inner ends are commonly fixed onto a common mounting ring 94. The mounting ring 94 also fixedly attaches a first latch 96 thereto which is arranged to selectively latch to the lower anchor 72 fixed to the rear end of the back portion of the harness. The two lower tethers 24 each extend from the inner ends to respective second latches 98 fixedly coupled to the outer ends 92 of the lower tethers respectively. Each second latch 98 is arranged for latching onto a respective one of the lower anchors of the vehicle while permitting the lower tether to be selectively released therefrom as desired.

To use the device 10 according to the first embodiment, the user typically secures the second latch of the retractable upper tether to the auxiliary anchor 20 of the vehicle and secures both second latches 98 of the two lower tethers to respective ones of the two lower anchors of the vehicle. The harness is then secured about the animal by inserting the head and neck of the animal through an opening defined between the two shoulder straps, followed by extension of the two lateral straps along the two opposing sides of the torso of the animal until the outer ends of the lateral straps can be selectively latched to respective connectors on the back portion of the harness. The harness is fitted to the animal the first time the harness is mounted on the animal by adjusting the length of the shoulder straps and the length of the lateral straps. The length of the straps is adjusted such that the animal is snuggly received between the chest panel 32 and the back portion 34 of the harness.

The animal is then secured and restrained relative to the vehicle by latching the upper connector 70 at the back portion of the harness with the first latch of the upper retractable tether while securing the first latch 96 of the two lower tethers to the corresponding lower connector at the rear of the back portion.

Upon initial use, the winding mechanism is also calibrated to the particular animal and vehicle with which the restraint device is intended to be used. In particular, the maximum extension length is set to correspond to a sufficient length which permits the animal to lay down with their chest against the seat bottom with minimal or no slack in the retractable tether portion. In this instance, as the animal assumes a standing position, the tether will automatically retract to shorten the effective length and maintain the upper retractable tether devoid of any slack.

The winding mechanism is further configured similarly to a conventional seatbelt such that any sudden extension of the retractable tether from the winding mechanism, for example of the type indicative of a vehicular collision, will result in the winding mechanism automatically locking to prevent extension of the retractable tether therefrom and thereby prevent the animal from being thrown forwardly relative to the seat of the vehicle.

Figure 16:
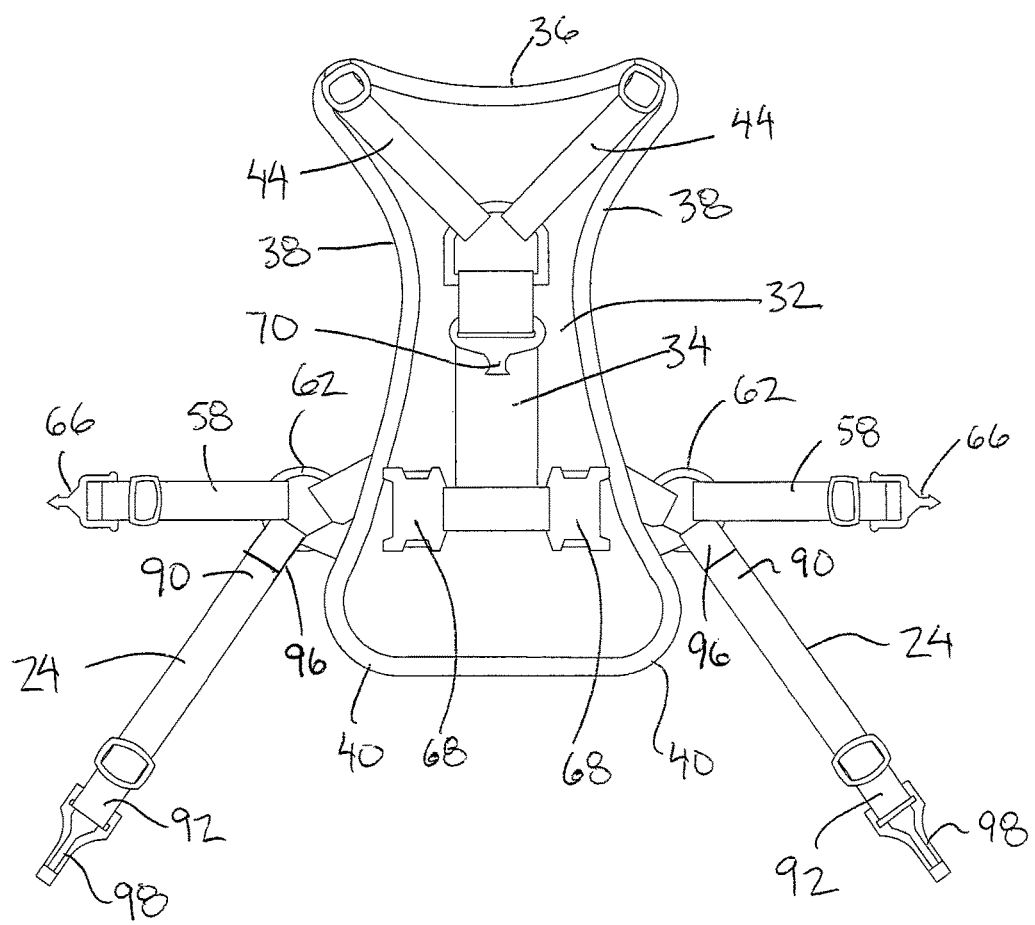
FIG. 16 is a is a top plan view of the harness including the two lower tethers connected thereto according to a second embodiment of the lower tethers, shown with the lateral straps in a released position.

Turning now to FIG. 16, according to a second embodiment of the lower tethers 24, each tether 24 again extends from an inner end 90 to an outer end 92. The inner ends are each provided with a respective first latch 96 connected thereto which is arranged to selectively latch to a respective one of the two mounting rings 62. The two lower tethers 24 each extend from the inner ends to respective second latches 98 fixedly coupled to the outer ends 92 of the lower tethers respectively. Each second latch 98 is again arranged for latching onto a respective one of the lower anchors of the vehicle while permitting the lower tether to be selectively released therefrom as desired. This arrangement provides a wider and more stable anchoring of the two lower tethers at laterally opposing sides of the harness so as to be possibly better suited for restraining larger animals. The remainder of the harness of FIG. 16 is identical to the first embodiment.

Figure 17:
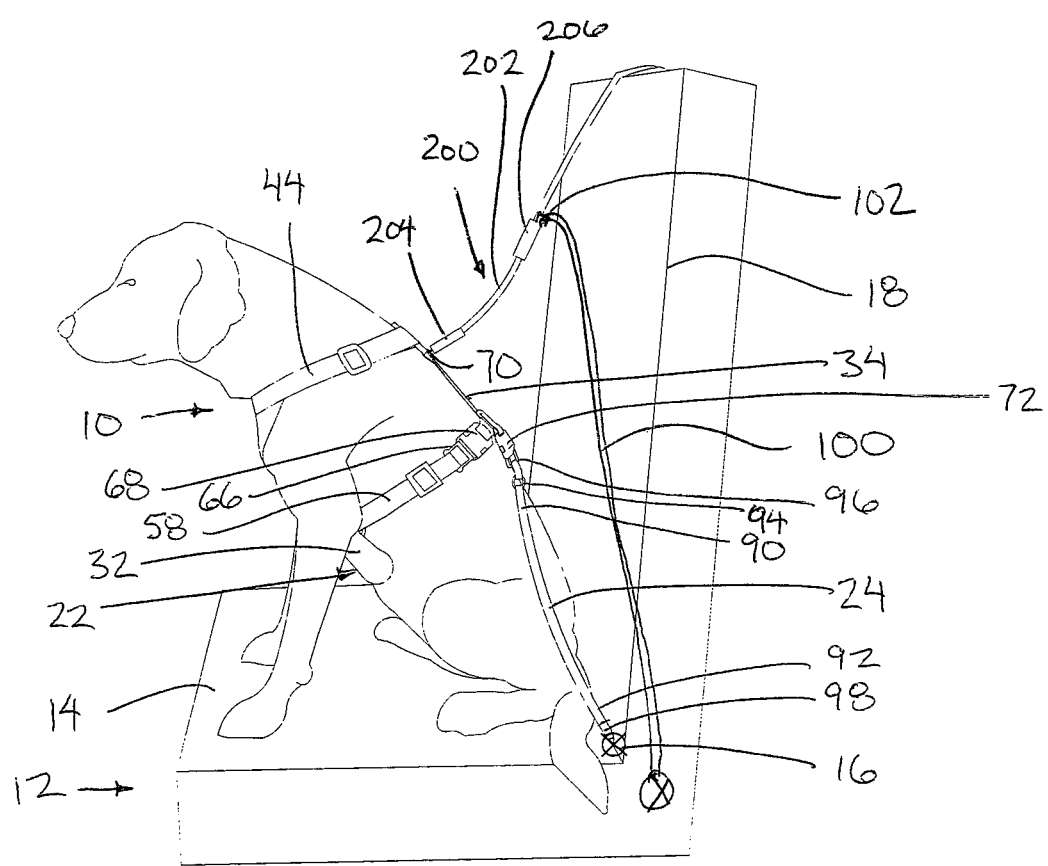
FIG. 17 is a side elevational view of the restraint device shown restraining a dog relative to a vehicle seat according to a second embodiment of the upper tether.

Turning now to FIG. 17, according to a second embodiment of the harness connection to upper retractable tether 26, the upper retractable tether 26 in this instance comprises an existing seatbelt 100 of the vehicle having a retractable strap connected to a male latching element 102 of the existing seatbelt. In this instance, an adapter 200 is provided in the form of a strap member 202 extending between a first latch 204 at one end which is adapted for releasable connection to the upper connector 70 of the harness, and a second latch 206 at the opposing end which comprises a universal female seatbelt connector. An adjuster can be mounted at an intermediate location along the strap member 202 to allow the overall working length of the strap member 202 between the first latch 204 and the second latch 206 to be adjusted. The second latch 206 is adapted for form a releasable connection with the male latching element of the existing seatbelt of the vehicle.

The remainder of the harness of FIG. 17 is identical to the first embodiment. The second embodiment of the upper retractable tether 26 can be combined with either mounting configuration of the lower tethers as described above.

According to the embodiments of FIGS. 16 and 17, the harness is secured to the animal in the same manner as the first embodiment noted above. When securement to the vehicle is desired, the two lower tethers are anchored to the lower anchors of the vehicle in the usual manner, but the first latches at the first ends of the two lower tethers are instead latched onto the two mounting rings 62 respectively. The upper connector 70 is secured to the first latch of the adapter 200 and the second latch 206 of the adapter 200 is coupled to the existing retractable seatbelt of the vehicle. The device then functions substantially identically to the first embodiment by providing a secure three-point anchoring of the animal to the vehicle seat, while still enabling the animal to safely move between an upright sitting position shown in FIG. 17, and a lower position lying down along the seat bottom of the vehicle seat.

Since various modifications can be made in my invention as herein above described, it is intended that all matter contained in the accompanying specification shall be interpreted as illustrative only and not in a limiting sense.

The invention claimed is:

1. An animal restraint device for restraining an animal relative to a vehicle seat having two lower anchors laterally spaced apart at a rear bottom of the seat and an auxiliary anchor separate from the lower anchors, and a retractable tether assembly having a retraction mechanism operable to vary an overall length of the tether assembly between opposing first and second ends of the tether assembly in which the second end is secured to the auxiliary anchor of the vehicle, the device comprising:

a harness extending longitudinally between a front end and a rear end for being secured about a torso of the animal such that the front end is proximate a neck of the animal and the rear end is nearer to a rear of the animal than the front end;

the harness including a chest panel for extending along a chest of the animal and a back portion for extending along a back of the animal opposite the chest panel;

a lower connector on the back portion of the harness;

a common latch which selectively mates in connection with the lower connector on the back portion of the harness;

two lower tethers, each extending between an inner end and an outer end having a lower latch thereon for securement to a respective one of the lower anchors;

the inner ends of the two lower tethers being mounted onto a common mounting ring together with the common latch such that the two lower tethers are selectively secured to the harness by the mating connection of the common latch with the lower connector on the harness; and an upper connector on the harness which is longitudinally spaced from the lower connector for connection to the first end of the retractable tether assembly.

2. The device according to claim 1 in combination with the retractable tether assembly in which the retractable tether assembly comprises a seatbelt of the vehicle, wherein the device further comprises an adapter arranged to be secured on the upper connector which includes a universal female seatbelt connector for releasable connection to the seatbelt of the vehicle.

3. The device according to claim 1 in combination with the retractable tether assembly in which the retractable tether assembly comprises a first latch at the first end for releasable connection to the upper connector of the harness and a second latch at the second end for releasable connection to the auxiliary anchor of the vehicle.

4. The device according to claim 3 wherein the retraction mechanism is biased from an extended position to a retracted position which is reduced in length relative to the extended position.

5. The device according to claim 1 further comprising two lateral straps for extending between the chest panel and the back portion of the harness at laterally opposing sides of the animal, wherein the lower connector is proximate a connection of the lateral straps to the back portion.

6. The device according to claim 5 wherein the harness further comprises:
   two front straps joined to one another at an intermediate location on the chest panel to extend laterally outward in opposing directions panel from respective inner ends to respective outer ends of the front straps for connection to the back portion through the lateral straps respectively;
   two rear straps joined to one another on the chest panel proximate the rear end to extend laterally outwardly in opposing directions from respective inner ends to respective outer ends of the rear straps in converging relationship with the two front straps respectively such that each front strap is joined with the respective rear strap at the outer ends thereof.

7. The device according to claim 1 wherein the harness further comprises an auxiliary leash anchor on the chest panel proximate the front end of the harness.

8. An animal restraint device for restraining an animal relative to a vehicle seat having two lower anchors laterally spaced apart at a rear bottom of the seat and an auxiliary anchor separate from the lower anchors, and a retractable tether assembly having a retraction mechanism operable to vary an overall length of the tether assembly between opposing first and second ends of the tether assembly in which the second end is secured to the auxiliary anchor of the vehicle, the device comprising:
   a harness extending longitudinally between a front end and a rear end for being secured about a torso of the animal such that the front end is proximate a neck of the animal and the rear end is nearer to a rear of the animal than the front end;
   the harness including a chest panel for extending along a chest of the animal and a back portion for extending along a back of the animal opposite the chest panel;
   two lower tethers, each extending between an inner end for connection to the harness and an outer end having a lower latch thereon for securement to a respective one of the lower anchors;
   an upper connector on the harness for connection to the first end of the retractable tether assembly;
   a pair of mounting rings supported on laterally opposing sides of the chest panel adjacent the rear end of the harness; and
   two lateral straps, each extending between one of the mounting rings and the back portion of the harness such that the two lateral straps are arranged to extend between the chest panel and the back portion at laterally opposing sides of the animal, the lateral straps being adjustable in length.

9. The device according to claim 1 wherein the harness further comprises two shoulder straps joined to the chest panel proximate the front end at inner ends of the shoulder straps and extending to respective outer ends for connection to the back portion, the shoulder straps being arranged to extend over respective shoulders of the animal between the chest panel and the back portion.

10. An animal restraint device for restraining an animal relative to a vehicle seat having two lower anchors laterally spaced apart at a rear bottom of the seat and an auxiliary anchor separate from the lower anchors, the device comprising:
    a harness extending longitudinally between a front end and a rear end for being secured about a torso of the animal such that the front end is proximate a neck of the animal and the rear end is nearer to a rear of the animal than the front end, the harness comprising:
       a chest panel extending in the longitudinal direction for spanning at least a portion of a chest of the animal;
       two front straps joined to one another at an intermediate location on the chest panel to extend laterally outward in opposing directions panel from respective inner ends to respective outer ends of the front straps;
       two rear straps joined to one another on the chest panel proximate the rear end to extend laterally outwardly in opposing directions from respective inner ends to respective outer ends of the rear straps in converging relationship with the two front straps respectively such that each front strap is joined with the respective rear strap at the outer ends thereof; and
       a back portion for connection between the outer ends of the front and rear straps at a back of the animal;
    at least one lower tether extending between an inner end for connection to the back portion of the harness and an outer end having a lower latch thereon for securement to at least one of the lower anchors.

11. The device according to claim 10 further comprising a center strap extending in the longitudinal direction along the chest panel of the harness in connection with the inner ends of the front and rear straps.

12. The device according to claim 10 further comprising two shoulder straps joined to the chest panel proximate the front end at inner ends of the shoulder straps and extending to respective outer ends for connection to the back portion, the shoulder straps being arranged to extend over respective shoulders of the animal between the chest panel and the back portion.

13. The device according to claim 12 wherein the shoulder straps are adjustable in length between the inner and outer ends thereof.

14. The device according to claim 10 further comprising an upper tether including a first latch for connection to the back portion of the harness and a second latch for connection to the auxiliary anchor.

15. The device according to claim 14 wherein the back portion of the harness is adjustable in length between a connection of the upper tether and a connection of the at least one lower tether.

16. The device according to claim 10 wherein each front strap and the respective rear strap are connected to the back portion by a respective lateral strap which is adjustable in length.

17. The device according to claim 10 further comprising an auxiliary leash anchor on the chest panel proximate the front end of the harness.

* * * * *